(12) United States Patent
Manfredi et al.

(10) Patent No.: US 7,735,119 B2
(45) Date of Patent: Jun. 8, 2010

(54) ACCESS CONTROL IN A WEB APPLICATION USING EVENT FILTERING

(75) Inventors: Raphael Manfredi, Grenoble (FR); Pierre Fouche, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1433 days.

(21) Appl. No.: 11/124,549

(22) Filed: May 6, 2005

(65) Prior Publication Data
US 2005/0262099 A1 Nov. 24, 2005

(30) Foreign Application Priority Data
May 7, 2004 (EP) .................. 04300264

(51) Int. Cl.
*G06F 21/00* (2006.01)
*H04L 29/06* (2006.01)

(52) U.S. Cl. ......................................................... 726/4
(58) Field of Classification Search .................. 726/2–4; 707/9, 10
See application file for complete search history.

(56) References Cited

U.S. PATENT DOCUMENTS

| | | | | |
|---|---|---|---|---|
| 6,061,692 | A * | 5/2000 | Thomas et al. | 707/200 |
| 6,085,224 | A * | 7/2000 | Wagner | 709/203 |
| 6,304,893 | B1 * | 10/2001 | Gish | 707/10 |
| 6,920,461 | B2 * | 7/2005 | Hejlsberg et al. | 707/101 |
| 7,234,037 | B2 | 6/2007 | Errickson et al. | |
| 7,240,280 | B2 * | 7/2007 | Jolley et al. | 715/234 |
| 2002/0080200 | A1 | 6/2002 | Wong et al. | 717/100 |
| 2002/0111965 | A1 | 8/2002 | Kutter | |
| 2002/0138556 | A1 * | 9/2002 | Smithline et al. | 705/26 |
| 2003/0046658 | A1 | 3/2003 | Raghavan et al. | |
| 2003/0229900 | A1 * | 12/2003 | Reisman | 709/228 |
| 2004/0088405 | A1 * | 5/2004 | Aggarwal | 709/224 |
| 2004/0177243 | A1 * | 9/2004 | Worley, Jr. | 713/2 |
| 2005/0132333 | A1 * | 6/2005 | Neumann et al. | 717/124 |
| 2008/0163202 | A1 * | 7/2008 | Kembel et al. | 717/178 |

FOREIGN PATENT DOCUMENTS

GB 2 355 904 A 5/2001

OTHER PUBLICATIONS

Anderson, D., "Using MVC Pattern in Web Interactions," Internet Article, Jul. 22, 2000, pp. 1-22, retrieved on Dec. 14, 2004: <http://www.uidesign.net/Articles/Papers/WebMVC-BrowsersTransactic.html>.

(Continued)

*Primary Examiner*—Gilberto Barron, Jr.
*Assistant Examiner*—Abdulhakim Nobahar

(57) ABSTRACT

A web application is described that is capable of assuming a plurality of states and being arranged to process a received event from among a predeterminable set of events to change from one state to another. A permission record defines a set of permitted or forbidden events and the web application comprises an event filter arranged to consult the permission record on receipt of an event in order to determine whether to permit or not permit the event to be processed. Related methods of access control and computer program products are also described.

12 Claims, 3 Drawing Sheets

OTHER PUBLICATIONS

Anonymous, "UML Semantics—Behavioral elements package: State machines," Internet Article, Sep. 1, 1997, 9 pages, retrieved on Dec. 10, 2004: <http://etna.int-evry.fr/COURS/UML/semantics/>.

Mohan, R. et al., "A State Machine Based Approach for a Process Driven Development of Web-Applications," *Lecture Notice in Computer Science*, Springer Verlag: New York, vol. 2348, 2002, pp. 52-66.

Rumbaugh, J., "State Trees as Structured Finite State Machines for User Interfaces," *Proceedings of the ACM SIGGRAPH Symposium on User Interface Software*, ACM: New York, 1998, pp. 15-29.

* cited by examiner

ACCESS CONTROL IN A WEB APPLICATION USING EVENT FILTERING

BACKGROUND OF THE INVENTION

The present invention relates to web applications.

The Internet has now become the primary global digital information distribution service. The World Wide Web (Web) allows users to navigate Internet resources in an exploratory way, without using internet protocol (IP) addresses or other special technical knowledge. The Web is made up of interconnected web pages, or web documents stored on web servers. These pages are accessed with the use of a web browser. Web browsers use URL addresses to access resources on the Internet.

The Web uses a transfer protocol known as Hypertext Transfer Protocol (HTTP). HTML and other types of web pages are made up of content text as well as formatting codes that indicate how the page should be displayed. A web browser interprets these codes in order to display the page.

The HTML, or other, code that makes up each web page may be dynamically generated by an event-driven program that is running on the server hardware. This type of program is known as a web application. In the following, the term "web server" will be used to refer to the logical entity that provides a web page in response to an http request and "web application" to the set of components that provide this function using general-purpose computing platforms within general-purpose operating environments such as are provided by the Microsoft Windows, Linux or HP-UX operating systems and their related programming libraries and tools.

Web applications are generally event-driven programs which react to HTTP requests from the client, the http request being directed to a web address (a URL). The web application will generate and return a web page to the browser. The difference between this type of arrangement and a simple "static" site is that each action the user takes can have some semantics associated with it. In other words, the resulting web page can differ according to the user, the current time or other factors prevailing in the system.

Thus, when the web application receives an event, it is arranged to evaluate the received event and decide how to respond to the client. This evaluation process may involve interaction with business logic of some kind. The interaction with the business logic can take place independently of the screen design or user interface and often involves transactions with back-end systems, such as remote databases. In web applications, the server side code that is responsible for the user interface (ie generation of the web pages to be served) is sometimes referred to as the presentation layer. For instance, in order to generate a web page, the presentation layer may need to access business data, such as a list of names and addresses. This can be obtained from the business logic, which can request the list from a database. The retrieved data can then be used by the presentation layer to build an appropriate HTML table for display, or rendering, by the browser.

Thus a web application can naturally be separated into a presentation layer, a business and a data layer. This separation is often referred to in web application server literature as the 3-tier model. Physically, the 3 tiers can be implemented separately and on different servers, a feature that can lead to greater scalability and an ability to process more client requests simultaneously.

One well-established architecture for user interfaces which facilitates event driven systems such as this is known as the Model-View-Controller or MVC architecture. The role of the controller in the MVC architecture is to determine the control flow of the system. It must process an incoming event from the user interface and determine the next state of the user interface. In addition, the controller generally must use the model component to carry out any actions required. This can change the state of the underlying business system. With this approach, the state of the underlying business system and the state of the user interface are two different, though often related, things. Thus, the presentation layer of a typical web application can be seen to comprise the view and controller elements. The model element, on the other hand, is separate from the presentation layer views and controllers. It is there to provide services to the presentation layer including access to persistent storage and thus represents the business logic and data layers.

It is possible to use a state machine for controlling a web application. For instance, a deterministic presentation layer can be achieved by modeling the User Interface using statecharts and then implementing the statechart design as part of a Model-View-Controller (MVC) engine that includes a State machine.

A further example of the use of a state machine for controlling a web application can be found in US2002/0080200 which describes a web application in which a state machine is provided to manage execution and display of a web site. The state machine includes display states and action states. In addition, the Perl module CGI::MxScreen uses a state machine to express its processing logic.

Due to their increasing size and complexity, web applications, and the service packages they are being used to provide, are to an ever-greater extent being developed as general purpose items that are configurable for deployment in a particular application. However, in the business of services offered through the web, all the customers don't necessarily buy the whole set of services that can be offered. Nevertheless, the web application they access may be capable of delivering all of them, and therefore a way is needed to deny access to the features of the application the customer has not purchased.

However, many conventional web applications do not explicitly provide for user authentication or for defining a security policy, including, for instance, which features of the application are accessible by which users. Such access control functions are often added as an after-thought, or implemented redundantly by having the business logic check for the suitable permissions before conducting an operation. US2002/0080200, for instance, proposes to use state transition permissions to determine whether a state transition is allowable on the basis of a user or system from which a request originates.

The present invention is directed to mitigating the above mentioned drawbacks with the prior art.

SUMMARY OF THE INVENTION

In brief, this is achieved by a web server comprising a web application capable of assuming a plurality of states and being arranged to process a received event from among a predeterminable set of events to change from one state to another, and a permission record defining a declared set of permitted or forbidden events, the web application comprising an event filter arranged to consult the permission record on receipt of an event in order to determine whether to permit or not permit the event to be processed.

A security model is thus created whereby the event filter acts as a focus for a security policy by denying events that have not been explicitly authorized, or vice versa.

The invention finds particular application where the web application comprises a presentation layer implemented by separate view and controller elements following the classical model-view controller (MVC) model and where the controller element comprises a state machine that formally describes the set of states for the application, and is the main support for controlling the operations that can happen. The dynamic generation of a web page is triggered on entry to at least some of the states. The events can be mapped from http requests by an event mapper and the states can correspond to user interface views of a web application.

In this case, the event filter can implemented as part of the state machine controller.

Since the state machine controller controls navigation through the web application, restricting the processing of an event can provide an effective way to deny access to parts of the application. The view element can also be arranged not to show the controls (hyperlinks for instance in a web application, in many cases arranged in displayed menus) that will generate forbidden events. However, it will be understood that merely not displaying a control for actuation is not sufficient protection, since the user can always enter desired URL directly in the browser, if they happen to know it or have previously bookmarked it.

Since the security controls are implemented together with the logic that controls the application's workflow, the business logic (ie the model element) as such no longer needs to be aware of the security being put in place, and can focus on its primary purpose, i.e. performing the processing it has to perform. In this way, redundant checking is prevented.

The permission file can define permitted events for user roles and can, in preferred embodiments, also link events to possible current states of the web application, the event filter being arranged to determine the current state of the application and the role of the user in order to determine whether to permit or not permit the event to be processed.

A second aspect of the invention, provides a method for access control within a web application capable of assuming a plurality of states and being arranged to process a received event from among a predeterminable set of events to change from one state to another, the method comprising defining in a permission record a set of permitted or forbidden events and consulting the permission record on receipt of an event in order to determine whether to permit or not permit the event to be processed.

The method can comprise triggering dynamic generation of a web page on entry to at least some of the states and/or mapping http requests received from a web browser to events.

A further aspect of the invention provides a computer program product for configuring a web server to assume a plurality of states and to process a received event from among a predeterminable set of events to change from one state to another, the computer program product comprising program code elements for providing an event filter for consulting, on receipt of an event, a permission record defining a set of permitted or forbidden events in order to determine whether to permit or not permit the event to be processed.

BRIEF DESCRIPTION OF THE DRAWINGS

An embodiment of the invention will now be described by way of example only, with reference to the following figures, wherein.

DETAILED DESCRIPTION OF THE PREFERRED EMBODIMENT

In the embodiments to be described below, the JavaServer Pages (JSP) technology is employed as a means to dynamically generate web pages, although it will be appreciated that any other suitable dynamic Web scripting/programming arrangement may equally be used. The JSP technology uses XML-like tags to encapsulate the logic that generates the content for a web page. The application logic can reside in server-based resources (such as JavaBeans) that the page accesses via these tags.

Figure 1:
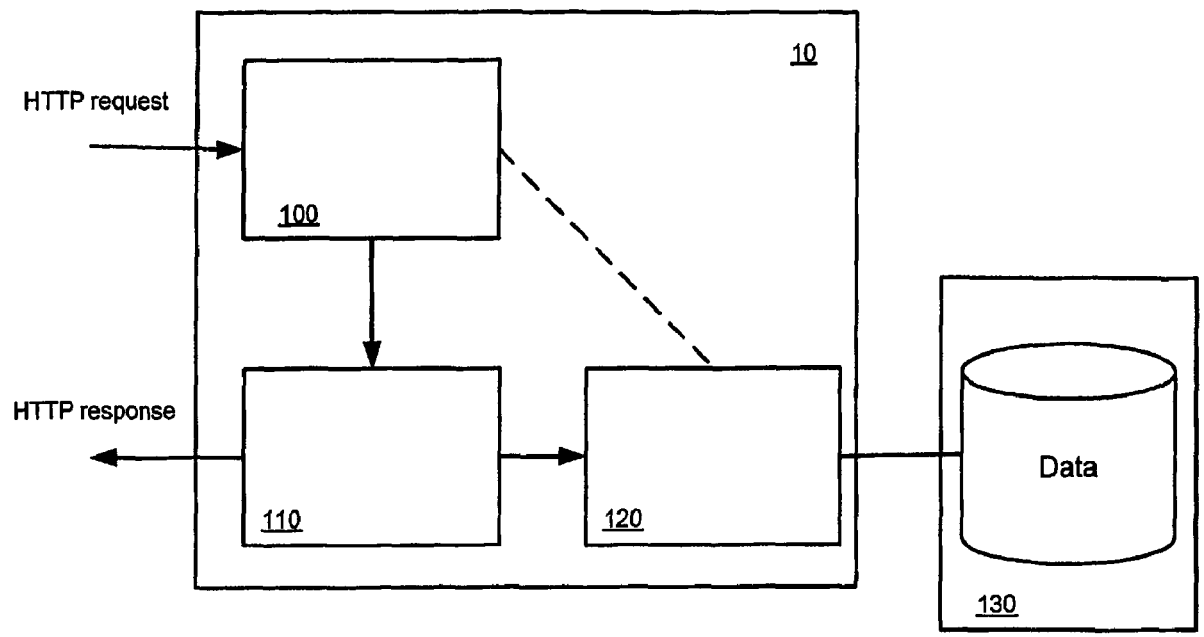
FIG. 1 is a schematic diagram showing a web application in the prior art.

FIG. 1 shows a known type of architecture for a web application that forms part of a web server illustrated generally at 10. The architecture shown in FIG. 1 comprises a servlet 100, one or more JSP pages 110 and one or more Javabeans 120 that may be used for accessing external data resources illustrated at 130. This general configuration is known as the JSP model 2 architecture and is an example of an MVC (model-view-controller) architecture.

As is well known, servlets are server-side software modules that fit into a web server framework and can be used to extend its capabilities. A JavaBean is simply a building block component that can be combined with other components in the same or other computers in a distributed network to form an application. Such components can be deployed on different servers in a network and communicate with each other for needed services.

Servlet 100 acts as the controller and is in charge of processing an incoming HTTP request by deciding, depending on the user's actions, which of JSP pages 110 to forward the request to, as well as instantiating any beans or objects 120 used by these JSP pages. In such architectures, there is not normally any processing logic within the JSP pages themselves; they are simply static templates that are arranged to populated by retrieving any objects or beans that may have been previously created by servlet 100, and extracting the dynamic content from them. The general operation of such a system will be generally well understood by those skilled in the art.

Figure 2:
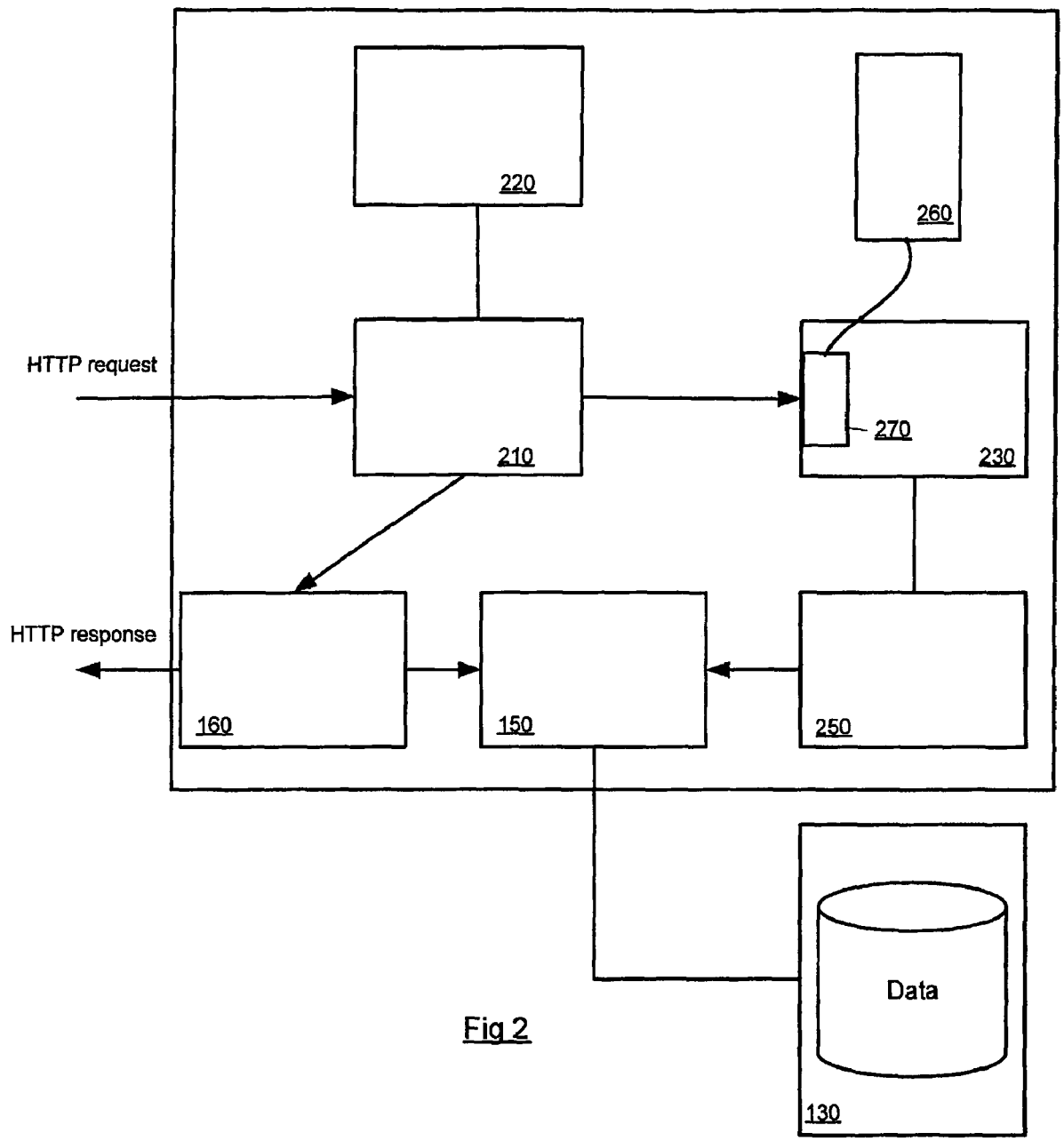
FIG. 2 is a schematic diagram showing a web application in an embodiment of the invention.

FIG. 2 illustrates a web application architecture of the same general type as that illustrated in FIG. 1 but in which the controller component is provided with a state machine. The operation of such a web application is as follows. First an incoming http request is received by a SmvController (State-Model-View Controller) servlet 210 which manages application flow and logic in a manner to be described in more detail below. Then, the request is mapped to an EventType by HTTP event type mapper 220 and passed to a State Machine Controller 230 which consumes the event according to a state machine definition 250. A session manager and session controller (not shown) are also present to manage user authorization in generally known manner (such components would also normally be present in the system illustrated in FIG. 1).

State machine definition 250 defines the flow and logic of the web application. States represent views and transitions between states represent actions. Web application developers define the states and transitions which handle request parameters, use business objects to handle business logic, and populate page beans given to the bean manager 150 to display information on pages.

After event handling, the SmvController servlet 210 forwards control to JSP view generator 160 to generate an HTML web page that will be sent the client browser. JSP view generator 160 typically makes use of Javaserver pages Standard Tag Library (JSTL) to help produce the HTML. These tag libraries in turn use information stored in the page beans.

The state machine used in this embodiment can contain nested states. In the State Machine Definition 250 each atomic state, ie a state that does not itself have sub-states, represents a screen that the user will see, with transitions among the various states representing the navigation flow between the screens. Superstates are used to encapsulate and provide transitions that are common to all of their substates.

Event-Type mapping dictionary 220 translates the HTTP messages sent to the application server into event objects that are meaningful for the application. Those events are then sent to the SmvController 210.

When the State Machine Controller 230 receives an event, it computes the next application state based on the combination of several factors: the current state it is in, the event received, the environment context and the set of allowed transitions from the current state. Actions can be attached to the state transition that will take place, to carry out the desired business logic.

When the new application state is determined, display of the page associated with that new state is triggered. Once the page is generated, provided to the browser and displayed, it presents options to the user for another interaction, and the cycle repeats itself.

The web application also comprises a file 260 that serves as a permission record defining a declared set of permitted events. State machine controller 230 comprises an event filter function 270 arranged to consult the permission record on receipt of an event in order to determine whether to permit or not permit the event to be processed. In this arrangement, the policy "forbid all, permit some" has been adopted so that absent any content in file 260, no events will be processed. Only events specifically permitted by inclusion in file 260 will be processed. Of course, the opposite policy "allow all, forbid some" may also be adopted in which case file 260 would contain details of events that are forbidden, and state machine controller 230 would be arranged to process all events except those referred to in file 260. An exception handler (not shown) is provided that implements a suitable action for when an event cannot be processed. It will be understood that this may take any suitable form, such as the display of an error message or simply redisplay of the page from which the forbidden event was generated.

Figure 3:
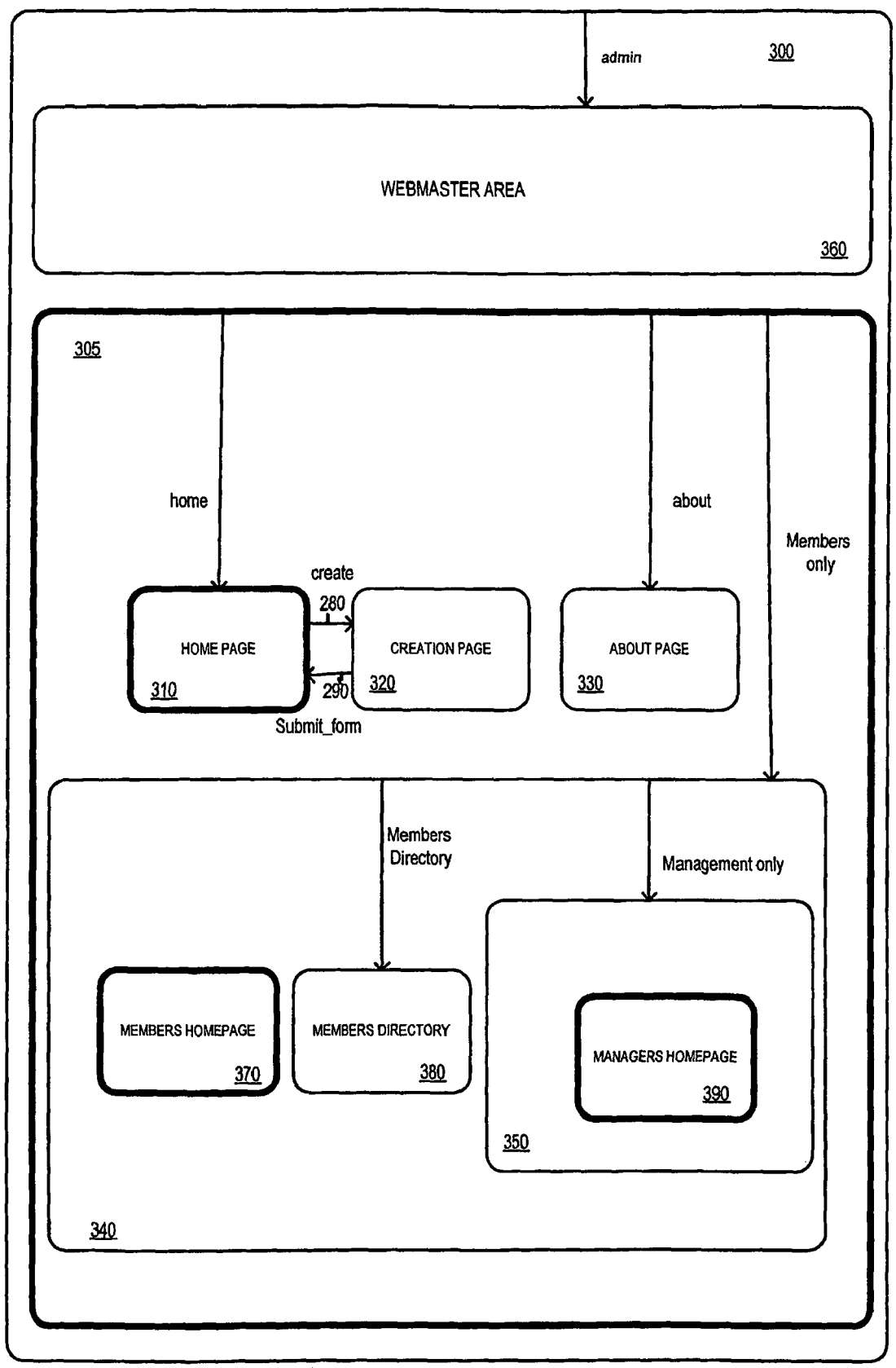
FIG. 3 is a state diagram showing the screen flow of a simple web application.

To illustrate the operation of the state machine controller in conjunction with the file 260, FIG. 3 is a hierarchical state diagram showing a set of different application screens and how a user can go from one to another by doing which action. The diagram comprises an overall super state 300, a user super state 305; three states corresponding to 3 regular web pages: home page 310; creation page 320 and about page 330, a "members only" super state 340 and a "management zone" superstate 350. In addition, a webmaster area 360 is provided for admin access to the whole of the site. Members only super state comprises 2 web pages: a members only home page 370 and a members directory page 380. Management zone superstate 350 comprises management homepage 390. Webmaster area 360 will also comprise web pages, although these are not specifically illustrated.

Within each superstate, one substate illustrated in bold is selected as the default substate that is entered by default on entry to the superstate. This default substate can be either configured to always be the same state, or can be dynamically computed on entry to the superstate. For example, on entry to the site, the user super state 305 is selected as the default state within super state 300 and the home state 310 is selected as the default state within user superstate 205. Thus on first entry to the site, it is the web page associated with home state 310 that is generated and displayed.

Similarly, on entry to member-only superstate 340 it is the members only home page that is generated as a result of entry into state 370 by default.

It is intended that different access control policies apply to the members only zone 340, management zone 350 and webmaster area 360.

The diagram illustrates 8 separate events that are used to trigger transitions of the state machine: home; about; create; submit_form; members_only; members_directory; management_only; admin.

It will be understood that transitions that are illustrated as being available from a superstate are available from each of the substates within the superstate. So, for instance the "Home" "about" and "members_only" events are available from each of 6 substates 310, 320, 330, 370, and 390.

Table 1 illustrates and example of a permission record that might be used to control access to the different areas of the site by filtering events.

TABLE 1

| Event | Role | Current_state |
|---|---|---|
| home; | User | |
| about; | User | |
| create; | User | Home page |
| submit_form; | User | |
| members_only; | Members | |
| members_directory; | Members | |
| management_only; | Management | |
| admin. | Admin | |

It is assumed that users of the site have associated with them a set of role credentials that represent roles the users either are authorized to perform. In the above example, the roles User; Member, Manager, Admin are involved. Each such role implies a corresponding set of access permissions—of which this mechanism is one. It will be understood that information as to the roles available to the current user are made available by the session manager.

The permission record information of Table 1 may be stored in any suitable format in file 260—such as as a flat text file. It can be seen that this very concise form of permission record can be used to filter events that are passed to state machine controller 230 for processing.

Thus, using the above example, if a members_only event is generated from any part of the site, by whatever means by a user that is not authorized by session manager 240 to play the role of a member, then the event will not be processed and this user will not be able to cause the state machine controller 230 to transition from eg "home" page 310 to "members home page" 370. On the other hand, a members_only event generated by a user that is authorized to play the role of a member will be processed by state machine controller 230 and will result in a transition to "members home page" state 370 and will trigger dynamic generation of the corresponding web page by view generator 160.

The line of table 1 corresponding to the "create" event illustrates a further feature of the system in that an authorized event may depend of the state machine being in a particular state. So, in the above example, the "create" event will only be processed in the state machine is in the home page state 310. There may be many reasons for this, for instance, Home page state 310 may correspond to the display of particular information that the site designer wishes to ensure the user had had the opportunity to read before being able to enter a subsequent creation page state. Thus, even if a user is able to generate an http request that corresponds to the "create" event in a manner other that actuating a control provided on a web page corresponding to the home page state 310 (such as by cut and paste or by using a bookmark mechanism), this event will not be processed unless that state machine is already actually in the home page state 310.

Since state machine controller 230 solely controls navigation within the site, restricting the processing of events is an effective way to deny access to parts of the application. It is then up to the view element application to show or not show the controls (hyperlinks mostly in a web application, probably in "menus") that will generate forbidden events, although it does not matter from a security point of view whether the controls are explicitly available or not.

The above described arrangement creates an explicit "security layer" in the application that can be reviewed easily, instead of having the security policy scattered through the whole code.

It will be appreciated that commercialised forms of the present embodiment would in practice take the form of a set of computer programs adapted to run on general-purpose computing platforms within general-purpose operating environments such as are provided by the Microsoft Windows, Linux or HP-UX operating systems and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware.

The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A computer, comprising:
a non-transitory computer program product;
a web server, provided on said non-transitory computer program product, comprising a web application capable of assuming a plurality of states and being arranged to process a received event from among a predeterminable set of events to change from one state to another, an event mapper that maps user requests to events, a state machine controller that computes a next application state based on combination of a current state of the state machine, the event received, an environment context and a set of allowed transitions from the current state, a definition file defining the states and the transitions between states based on the events, and a permission record file defining one or more events each corresponding to a role credential, wherein the web application comprises an event filter arranged to consult the role credentials and corresponding events in the permission record file on receipt of an event for a particular user role credential to determine whether to permit or not permit the event to be processed for such user role credential to cause a state transition.

2. The computer as claimed in claim 1 wherein the dynamic generation of a web page is triggered on entry to at least some of the states.

3. The computer as claimed in claim 1 wherein at least some of the states correspond to user interface views of the web application.

4. The computer as claimed in claim 1 wherein the event filter is part of a state machine controller that controls transitions between the states and that interacts with business logic.

5. The computer as claimed in claim 1 wherein the permission record file further defines, for at least one defined event, a state of the web application, and the event filter being arranged to further determine the current state of the application and a user role credential for a received event to determine whether to permit or not permit the received event to be processed.

6. A method for access control within a web server computer, comprising:
assuming a plurality of states by the web server and the web server being arranged to process a received event from among a predeterminable set of events to change from one state to another;
computing by a state machine controller a next application state based on combination of a current state of the state machine, the event received, an environment context and a set of allowed transitions from the current state;
defining in a permission record file a set of permitted or forbidden events, each event corresponding to a role credential, mapping user requests to events; and
consulting, by the web server, the permission record file on receipt of an event from a user having a particular user role credential to determine whether to permit or not permit the event to cause a change in state of an application.

7. The method as claimed in claim 6 comprising triggering dynamic generation of a web page on entry to at least some of the states.

8. The method as claimed in claim 6 wherein the permission record file includes for at least one event and corresponding role credential, and said method further comprising determining the current state of the application, and consulting said permission record file to determine whether to permit or not permit the event to be processed to change the state of the application.

9. A non-transitory computer program product containing a web server to assume a plurality of states and to process a received event from among a predeterminable set of events to change from one state to another, the web server comprising program code elements for mapping user requests to events and for providing an event filter for consulting, on receipt of an event, a state machine controller that computes a next application state based on combination of a current state of the state machine, the event received, an environment context and a set of allowed transitions from the current state, a permission record file defining one or more events each corresponding to a role credential to determine whether to permit or not permit the received event to be processed based on a comparison of the received event and an associated role credential with the events and corresponding role credentials in said permission record file.

10. The non-transitory computer program product as claimed in claim 9 comprising program code elements for providing an event mapper for mapping http requests received from a web browser to events.

11. The non-transitory computer program product as claimed in claim 9 wherein the event filter is part of a state machine controller.

12. The non-transitory computer program product as claimed in claim 9 wherein the event filter is arranged to determine the current state of the application in order to determine whether to permit or not permit an event to be processed.

* * * * *